United States Patent [19]
Bisson et al.

[11] Patent Number: 5,232,723
[45] Date of Patent: Aug. 3, 1993

[54] PROCESS FOR IMPROVING THE TEXTURE OF MEAT WITH WHEY PROTEINS

[75] Inventors: Jean-Pierre Bisson, Saint Jean des Baisants; Emmanuel Miege, Beauvais; Gilles Poillot, L'Isle Adam, all of France

[73] Assignee: Nestec S.A., Vevey, Switzerland

[21] Appl. No.: 885,907

[22] Filed: May 18, 1992

Related U.S. Application Data

[63] Continuation of Ser. No. 642,289, Jan. 17, 1991, abandoned.

[30] Foreign Application Priority Data

Feb. 9, 1990 [EP] European Pat. Off. ......... 90102562

[51] Int. Cl.$^5$ ...................... A23L 1/314; A23L 1/318
[52] U.S. Cl. ..................................... 426/281; 426/641
[58] Field of Search ............... 426/281, 641, 646, 652

[56] References Cited

U.S. PATENT DOCUMENTS

| | | | |
|---|---|---|---|
| 3,506,455 | 4/1970 | Savage et al. | 426/641 X |
| 3,537,864 | 11/1970 | Magiera. | |
| 3,930,056 | 12/1975 | Feminella et al. | 426/646 |
| 4,071,635 | 1/1978 | Lindl et al. | 426/652 X |
| 4,348,420 | 9/1982 | Lynch et al. | 426/646 X |
| 4,402,987 | 9/1983 | von Lersner et al. | 426/281 |
| 4,492,712 | 1/1985 | Casella | 426/652 X |
| 4,746,522 | 5/1988 | Wofford et al. | 426/243 |
| 5,039,538 | 8/1991 | Tamaki et al. | 426/281 |
| 5,039,539 | 8/1991 | Tamaki et al. | 426/281 |

FOREIGN PATENT DOCUMENTS

| | | | |
|---|---|---|---|
| 0031631 | 7/1981 | European Pat. Off. | |
| 63-192362 | 8/1988 | Japan | 426/646 |

*Primary Examiner*—Arthur L. Corbin
*Attorney, Agent, or Firm*—Vogt & O'Donnell

[57] ABSTRACT

The texture of meat is improved by incorporating a marinade containing denatured whey proteins into raw meat, said whey proteins being present in an amount of from 0.5% to 2.5% by weight based on the weight of the raw meat.

20 Claims, No Drawings

PROCESS FOR IMPROVING THE TEXTURE OF MEAT WITH WHEY PROTEINS

CROSS REFERENCE TO RELATED APPLICATION

This application is a continuing application of application Ser. No. 07/642,289, filed Jan. 17, 1991, now abandoned.

BACKGROUND OF THE INVENTION

This invention relates to a process for improving meats intended for cooking, more particularly those intended for prepared dishes.

Some cooked pieces of high-quality meat, i.e. lean and low in collagen, can have texture deficiencies when they are regenerated in an oven or in boiling water after having been stored, for example, in the frozen state, even if cooking has been brief and carried out at low temperature. Other pieces of meat of poorer quality, i.e. generally containing more fat and more collagen, require longer cooking at higher temperatures. In this case, water is exuded in considerable quantities during cooking. The texture is thus dry, heterogeneous and hard. The meat yield diminishes as a result of the exudation.

To obviate these disadvantages and to obtain the desired tenderness and juiciness with an improved yield, polyphosphates are generally incorporated in the raw meat, for example in the form of a marinade. This addition is unpopular among consumers because, although the polyphosphates retain water during cooking and ensure the desired tenderness, they generally conceal the fibrous texture of the meat by giving it a texture resembling that of delicatessen products. In addition, the use of polyphosphates is being increasingly opposed at the nutritional level.

It has been proposed to incorporate native whey proteins as an extending agent in raw meat, cf. for example European Patent Application EP-A 31 631. We found that this method had both technical disadvantages insofar as the incorporation of high-foaming native proteins was difficult and organoleptic disadvantages in the respect that the texture was unsatisfactory.

SUMMARY OF THE INVENTION

The present invention enables the disadvantages mentioned above to be obviated.

The process according to the invention, in which the meat is treated with a marinade containing lactic proteins so that the marinade is completely absorbed, is characterized in that thermally denatured whey proteins are incorporated in the raw meat in a quantity of 0.5 to 2.5% by weight.

The denatured whey proteins (DWPs) constitute 0.5 to 2.5% and preferably 0.8 to 1.6% by weight of the raw meat. According to the invention and in the interests of clarity, the quantity of denatured protein should in fact be understood as the theoretical quantity of pure protein and not as the quantity of protein concentrate as obtained in practice. By contrast, in the Examples, the quantities incorporated relate to the concentrate.

The whey protein concentrate makes up 9 to 20% by weight of the marinade. The marinade may contain other ingredients, such as carbohydrates, for example starch, lactose, glucose, maltodextrin, salt, spices and flavourings.

The marinade preferably contains 7 to 13% by weight non-gelatinized starch.

DETAILED DESCRIPTION OF THE INVENTION

In accordance with the present invention, the meat to be treated

May be, for example, pork, beef, lamb, veal, poultry, for example chicken or turkey, or game. It may be selected from the better cuts low in fats and in collagen, for example tenderloin, loin, kernel of pork or veal, blade-bone of beef, breast of chicken or turkey. It also may consist of poorer cuts containing more fat and collagen, for example neck of beef, veal, lamb or mutton, chopped kernel of pork, knuckle of beef, veal, pork, lamb or mutton, drumstick or thigh of chicken or turkey.

The sizes of the pieces may vary from the complete muscle to cubes, slices or mince. The pieces are preferably trimmed, i.e. freed from most of the visible fat, connective tissue and nerve tissue.

The whey proteins emanate from sweet whey for cheese manufacture of which the pH value is adjusted to 6-7. They are subjected to a thermal denaturing treatment. The desired denaturing level is 50 to 90%. The denaturing level is expressed by the following ratio:

$$\frac{\text{total nitrogen} - \text{soluble nitrogen}}{\text{total nitrogen} - \text{non-protein nitrogen}} \times 100$$

by conventional nitrogen analysis using the Kjeldahl method.

The denaturing treatment may be carried out on the whey as such or concentrated, for example, to approximately 15% dry matter by weight, for example by evaporation in vacuo. The heat treatment may be carried out in batches, for example in a double-walled tank with stirring, or continuously in a heat exchanger, for example of the scraped-surface, plate or tube type, or even in an ultra-high-temperature sterilizer. The treatment time and temperature may be adapted to the required denaturing level and may be, for example, 95°-125° C. and 3 to 30 mins, respectively, the highest temperature being associated with the shortest time.

Flocculation occurs. The dispersion is neutralized with a basic solution and is then concentrated by ultrafiltration to approximately 20–22% by weight dry matter. This step enables the dispersion to be enriched with whey proteins, for example to 30–40% by weight dry matter, by eliminating part of the lactose and the minerals. Finally, the retentate is dried, for example by spray drying.

Because they are denatured, the proteins do not gel during subsequent cooking. Gelling is ensured by the starch. In the preferred gelling system, the denatured whey proteins would structure the gel by linking with the muscle fibres, although this is of course only a hypothesis. The resulting stabilization of the texture would resist any retraction of fibres during the successive heat treatments, for example cooking, freezing and regeneration in the kitchen, by acting on the tenderness of the meat. The starch responsible for the formation of the gel stabilizes the water present in the muscle and prevents excessive exudation during the successive heat treatments.

Thus, the choice of the starch and its concentration are adapted to the method of cooking, i.e. brief or prolonged. The starch selected, for example, may gel at a temperature of from 65° C. to 75° C. or from 90° C. to 100° C. In the case of brief cooking, which is suitable for lean meats of high quality, for example 15 to 25 minutes at a core temperature of approximately 70° to 80° C., starch from tubers, for example potato starch, is particularly suitable. For the treatment of poorer quality meats richer in collagen, prolonged cooking, for example for 3 to 4 h, at a core temperature of 90° to 100° C. requires a starch capable of withstanding high temperatures, for example a cereal starch, more particularly crosslinked, modified corn starch. The starch may of course be selected from conventional sources, for example rice, wheat or corn.

To prepare the marinade, the ingredients except the DWPs and the starch are dissolved in cold water, for example at 4° to 20° C. The starch and, last of all, the DWPs are then incorporated with vigorous stirring. Since the starch is not soluble in cold water, either the viscosity of the solution may be increased by addition of a thickener or, preferably, stirring may be carried out continuously before or during incorporation to prevent the starch from sedimenting which would result in irregular distribution of the constituents of the marinade.

The quantity of marinade incorporated in the meat may amount to between 10 and 20% by weight, based on the raw meat. The method by which the marinade is incorporated in the pieces of meat may be by injection, e.g., by means of needles, followed by churning, preferably in a light vacuum, which provides for thorough and uniform penetration and distribution of the marinade. In some cases, for example for poultry meat, small pieces or mince, churning is sufficient. The churning time should not be too long in order to maintain the integrity of the pieces. The churning time is, for example, from 10 to 30 minutes.

The treatment with the marinade is preferably carried out at a low temperature of 0° to 10° C. after the meat has been heated to a temperature of −3° C. to 4° C.

Depending on the type of meat and the pieces, cooking may be brief or prolonged or may even be carried out under pressure. The pieces may be browned before cooking. In this case, it is of advantage to coat the pieces with an oil-based coating marinade before browning. The coating marinade may contain, for example, soya sauce, meat extract, glucose, frying oil, spices. It may be applied in a quantity of 3 to 7% by weight, based on the raw meat, by simple kneading.

Cooking may be carried out by stewing, for example in the presence of a stock, with separation of the cooking juice by draining, followed after cooking and cooling by reincorporation of a sauce containing the juice and packing in the presence of a garnish, for example vegetables, in a container.

Alternatively, cooking may be carried out in a container, for example in an open casing, optionally after browning of the pieces, the juice may be separated by draining after cooking and the casing sealed. In this case, the meat may constitute an intermediate product intended for subsequent use in a prepared dish.

After cooking and cooling, the meat or the prepared dish containing the meat may be packed, refrigerated, frozen or even sterilized.

The products obtained in accordance with the invention may be regenerated by treatment in boiling water, in a microwave oven, in an infrared oven or in a gas oven.

The texture of the meats is stabilized as a function of time, i.e. is homogeneous, constant and precisely defined, despite the heat treatments involved in freezing and regeneration. The meats have excellent organoleptic properties and, in particular, are juicy and tender and have a good flavour. By virtue of the process according to the invention, the original texture of the meats is retained throughout the treatment, storage and regeneration. The yield of the process is comparable with the yield obtainable by incorporation of polyphosphates.

The whey proteins have a desired whitening effect on poultry meats.

EXAMPLES

The invention is illustrated by the following Examples in which percentages are by weight. In these Examples, the global yield is expressed as the percentage by weight of meat obtained after the treatment in relation to the meat initially used. The cooking yield is the percentage by weight of meat obtained after cooking in relation to the marinated meat, i.e.:

$$\frac{\text{cooked meat (not cooled, but optionally drained)}}{\text{meat + marinade}}$$

PREPARATION OF DENATURED WHEY PROTEINS

EXAMPLE 1

Whey from the production of Camembert, dry matter content 6.5%, consisting of 75% lactose, 12% protein, 8.8% minerals and 5% fats is concentrated by evaporation to 15% dry matter. The initial pH of 6.3 falls to 6.1. The concentrate is then heat-treated with stirring for 30 minutes at 95° C. in a double-walled tank. A flocculate is formed. The suspension is neutralized to pH 7 by addition of an aqueous sodium hydroxide solution. After its temperature has been adjusted to 50° C., the suspension is subjected to ultrafiltration in a module equipped with membranes having a molecular weight cut-off zone of 20,000 to 40,000 daltons until the retentate has a dry matter content of 21–22%. Finally, the retentate is dried by spray drying. The denatured whey proteins obtained have the following composition:

|  |  | % |
|---|---|---|
| Dry matter |  | 96 |
| including | protein | 40 |
|  | fats | 5 |
|  | lactose | 38 |
|  | minerals | 13 |
| Water |  | 4 |

The denaturing level (Kjeldahl method) is 80%.

EXAMPLES 2–6

The procedure is as in Example 1 above, except that the thermal denaturing treatment is carried out in the apparatus indicated and under the treatment temperature and time conditions indicated in Table 1 below starting out from whey containing 6.5% dry matter, i.e. non-concentrated:

TABLE 1

| Example | Apparatus | Temperature (°C.) | Time (mins.) | Denaturing level (%) |
|---|---|---|---|---|
| 2 | Scraped-surface heat | 110–112 | 6 | 70 |

TABLE 1-continued

| Example | Apparatus | Temperature (°C.) | Time (mins.) | Denaturing level (%) |
|---|---|---|---|---|
| 3 | Scraped-surface heat exchanger | 107 | 5 | 60 |
| 4 | Plate-type heat exchanger | 110-112 | 6 | 70 |
| 5 | Plate-type heat exchanger | 95 | 5 | 50 |
| 6 | UHT (ultra-high-temperature) sterlizer | 125 | 3 | 70 |

EXAMPLE 7

A piece of pork loin weighing 0.3 kg, which has been trimmed and defatted, is defrosted in a heating cupboard kept at 4° C. The piece of meat has a pH of 5.5-5.8. A marinade representing 15% of the raw meat is injected into the centre of the piece of meat by means of a multiple-needle injector. The injection marinade has the following composition:

|  | % |
|---|---|
| Denatured whey proteins (DWPs) according to Example 1 | 18 |
| Crystallized glucose | 7.9 |
| Salt | 4.9 |
| Water | 69.2 |

It is prepared by dissolving the salt and glucose in cold water and then incorporating the DWPs with vigorous stirring. After injection, the meat is treated in a malaxating churn for 30 minutes at 10° C. after having been coated with a coating marinade. The coating marinade represents 7% of the raw meat and has the following composition

|  | % |
|---|---|
| Hydrolyzate, meat extract | 49 |
| Native starch | 12 |
| Vegetable oil | 20 |
| Reducing sugar | 6 |
| Water | 13 |

The meat is then treated by brief cooking at a low temperature in a controlled-humidity oven to a core temperature of 75° C. The meat is then cooled to 15° C. in a ventilated tunnel. After cutting into slices, the meat is placed with a sauce in a bag of flexible, boilproof plastic material which is then hermetically sealed. Finally, the bags are frozen at −30° C.

The cooking yield is 78% and the global yield 93%.

COMPARISON EXAMPLES A-D

A. By way of comparison, the cooking yield is 74% and the global yield 81% in the case of a meat into which no marinade has been injected. In addition, after regeneration for 15 minutes in boiling water, the core temperature being 60° C., the texture is considered to be unctuous and tender for the injected meat whereas the non-injected meat has a dry, hard and heterogeneous texture.

B-D. In order to demonstrate the advantages of injecting thermally denatured whey proteins over native whey proteins, loin of pork is cooked in the same way as in Example 7 except that the injection marinade contains 8% (Example C) and 12% (Example B) of native whey proteins, depending on their composition, in order to obtain a whey protein content of 0.95% in the raw meat after the injection of 15% marinade, based on the raw meat. The marinade also contains 4.6% salt, the balance to 100% being water and glucose. In addition, there is no coating. In Example D, there is no injection. Regeneration is carried out in the same way as in Comparison Example A above. The results relating to the yield and texture are shown in Table 2 below.

TABLE 2

| Example | Whey protein | Cooking yield (%) | Texture Average tasting mark[1] | Comments |
|---|---|---|---|---|
| B | Native, obtained by ultrafiltration, 60% protein | 78 | 7 | Initially soft, then sandy after chewing |
| C | Native, obtained by column chromatography, 90% protein | 68 | 6 | Dry[2] |
| D (without injection) | — | 74 | 5 | Dry, hard and heterogeneous |
| 7 (recall) | DWPs, 40% protein | 78 | 7-8 | Soft and regular |

Legend
[1]The higher the mark, the better the texture.
[2]In the case of Example C, this protein is difficult to use because it expands during its dissolution.

In the course of the tests, the DWPs showed certain advantages over the native proteins:

They are readily dispersible in water with vigorous stirring and do not have the foaming properties of native whey proteins.

The DWPs do not have gelling properties under the effect of heat. By contrast, the native whey proteins do not gel completely under the cooking conditions used. This explains the sandy character observed in Comparison Example B due apparently to the presence of suspended protein particles which have not yet gelled.

The DWPs have the ability to retain more water and to act as a binder which gives the meat a stabilized, more juicy, soft and homogeneous texture.

EXAMPLES 8-12

Various pieces of meat are treated in the same way as in Example 7 using an incorporation marinade in a quantity of 10 or 20%, based on the raw meat. The incorporation marinade has the following composition:

|  | % |
|---|---|
| DWP concentrate of Example 1 | 9-15 |
| including 40% protein | 3.6-6 |
| Potato starch | 9-12.7 |
| Lactose | 6 |
| Salt | 4.5 |
| Water | balance 100 |

To prepare the marinade, the salt and the lactose are first dissolved in water at 10° C. in a tank, after which the starch and the DWPs are incorporated with vigorous stirring. To prevent sedimentation of the starch, which does not dissolve at 10° C., the contents of the tank are stirred continuously during incorporation in the meat.

The above marinade is incorporated either by injection or by churning. In the latter case, churning lasts 15 minutes and no coating marinade is used. The conditions of the process and the results obtained are set out in Table 3 below.

TABLE 3

| Example | Meat | Incorporation of marinade, % | Marinade DWPs (%) | Starch (%) | Cooking yield (%) | Texture Average mark | Comments |
|---|---|---|---|---|---|---|---|
| 8 | Tenderloin of pork | Injection, 20% | 15 | 12.7 | 81 | 8 | Soft and juicy |
| 9 | Shoulder of veal | Injection, 10% | 10.9 | 9 | 75 | 7-8 | Homogeneous and soft |
| 10 | Shoulder of pork | Injection, 20% | 15 | 11.5 | 77 | 8 | Soft |
| 11 | Breast of chicken | Churning, 20% | 9 | 13 | — | 8-9 | Soft |
| 12 | Thigh and drumstick of turkey | Churning, 20% | 9 | 13 | — | 8-9 | Soft |

Legend: not determined

COMPARISON EXAMPLES E-J

By way of comparison, the same pieces are prepared in the same way either with injection of 20%, based on the raw meat, of an aqueous solution containing polyphosphates (the content of injected polyphosphates is 0.3%, expressed as $P_2O_5$, based on the raw meat, Example E) or without injection (Examples F-J).

The process conditions and the results are shown in Table 4 below:

TABLE 4

| Example | Meat | Injection, % | Cooking yield (%) | Texture Average tasting mark | Comments |
|---|---|---|---|---|---|
| E | Tenderloin of pork | Polyphosphate solution, 20% | 82 | 7 | Soft and tender, but "preserved", dries during storage |
| F | Tenderloin of pork | — | 74 | 5-6 | Dry, hard, heterogeneous |
| G | Shoulder of veal | — | — | 6-7 | Dry and heterogeneous |
| H | Shoulder of pork | — | — | 6 | Dry, hard |
| I | Breast of chicken | — | — | 7 | Dry, grey appearance |
| J | Thigh and drumstick of turkey | — | — | 7 | Dry, separation of particles of brown meat |

Legend: without incorporation or not determined

Compared with the polyphosphates, the mixture of DWPs and potato starch enables a substantially equivalent yield to be obtained (8 compared with E). From the point of view of texture, it is soft, juicy and tender while maintaining the characteristics of the original meat whereas the polyphosphates mask the fibrous structure of the meat, the "preserved" texture resembling that of the delicatessen product. The stabilized texture obtained in 8 is maintained during storage for at least 6 months at −10° C. and at −20° C. whereas, according to E, the meat dries out during storage.

For veal, (9 compared with G), the injection of DWPs and potato starch, by standardizing the textures of the various constituent muscles of the shoulder, avoids fine cutting of the piece of meat which is difficult to carry out on an industrial scale.

So far as poultry meat (11 compared with I and 12 compared with J), the injection of DWPs and starch gives a juicy texture with no separation of particles and whitens the meat.

EXAMPLES 13-14

Pieces of meat of poorer quality containing more collagen than the meats of the preceding Examples require longer cooking at a higher temperature than in the preceding Examples (stewing).

Meat relatively rich in collagen is defrosted and heated to 0°-2° C. After cutting into cubes, the meat is completely defrosted at 4° C., after which the pieces are injected with an injection marinade having the following composition by means of a multiple-needle injector.

|  | % |
|---|---|
| DWP concentrate of Example 1 | 15.2 |
| Modified corn starch | 10.8 |
| Lactose | 12.5 |
| Salt | 7.7 |
| Water | balance to 100 |

The pieces are then kneaded with a coating marinade in the same way as in Example 7. The pieces are then browned and are then placed on plates with a cooking stock. The pieces are then cooked in the presence of steam-saturated air to a core temperature of 95° C. After draining, the pieces of meat are cooled and then placed in containers with a garnish of vegetables and a sauce. A lid is placed on the containers which are put into cartons and finally frozen at −30° C.

After regeneration in a domestic infrared oven or microwave oven, the meats are tasted. The nature of the meats, the injection conditions and the tasting results are shown in Table 5 below.

TABLE 5

| Example | Meat | Injection % | Global yield % | Texture mark |
|---|---|---|---|---|
| 13 | Pork stew | 10 | 72 | 8 |
| 14 | Boeuf bourguignon | 10 | 70 | 8 |

COMPARISON EXAMPLES K-L

By way of comparison, the same meats (K: pork, L: beef) are treated by injection with 10% of an aqueous solution containing polyphosphates (the content of injected polyphosphates is 0.3%, expressed as $P_2O_5$, based on the raw meat). The meats containing polyphosphates are awarded a mark of 7. They are more compact, the fibers are masked.

EXAMPLES 15-16

15. Raw beef containing 15% fat and 16 to 18% collagen, based on the proteins is roughly chopped after which a marinade having the following composition is added:

| | % |
|---|---|
| DWP concentrate of Example 1 | 13.8 |
| Modified corn starch | 8.1 |
| Salt, reducing sugar and flavouring | 11 |
| Water | 67.1 |

The meat is mixed with the marinade (representing 15% of the raw meat). The meat is then chopped finely into 6 mm particles and placed in casings which are closed at only one of their ends. The meat is then cooked in boiling water so as to maintain a core temperature of >90° C. for 45 minutes. After cooking, the meat is drained, the casings are hermetically sealed, rapidly cooled and then frozen.

The global yield, i.e. the percentage of drained cooked meat in relation to the raw meat used, is 80 to 83%. By way of comparison, the global yield of the same process without incorporation of marinade is 62-65%.

16. Raw beef having the same fat and collagen content as in Example 15 is cut into cubes weighing 25-30 g and then injected with 15% marinade, based on the raw meat, using a multiple-needle injector.

The injection marinade has the following composition:

| | % |
|---|---|
| DWP concentrate of Example 1 | 13.8 |
| Modified corn starches | 8.1 |
| Salt, reducing sugar and flavouring | 14.5 |
| Water | 63.6 |

After injection, the meat is kneaded in the presence of an oil-based coating marinade representing 3% of the raw meat. The pieces are then browned, placed in casings and subjected to the same operations as in Example 15. The global yield is 80% whereas the global yield of the same process without injection of marinade is 63%.

We claim:

1. A process for improving the texture of meat comprising:
   heating a whey at a temperature of from 95° C. to 125° C. for from 3 minutes to 30 minutes to obtain a suspension containing whey proteins denatured to a level of from 50% to 90%;
   partly eliminating lactose and minerals from the suspension to obtain a retenate enriched in denatured whey proteins;
   incorporating the retenate into a marinade; and
   incorporating the marinade into pieces of raw meat so that the meat contains from 0.5% to 2.5% by weight denatured whey proteins based on the weight of the raw meat.

2. A process according to claim 1 wherein the whey is a sweet whey.

3. A process according to claim 1 further comprising, before heating, evaporatively concentrating the whey in vacuo to obtain a whey which is approximately 15% dry matter by weight.

4. A process according to claim 1 wherein lactose and minerals are partly eliminated from the suspension by ultrafiltration.

5. A process according to claim 4 wherein the retenate contains denatured whey proteins in an amount up to 40% by weight dry matter.

6. A process according to claim 1 further comprising neutralizing the pH of the suspension before partly eliminating lactose and minerals.

7. A process according to claim 1 further comprising drying the retentate before incorporation into the marinade.

8. A process according to claim 7 wherein the retentate is spray dried.

9. A process according to claim 1 wherein the denatured whey proteins are incorporated into the raw meat in an amount of from 0.8% to 1.6% by weight based on the weight of the raw meat.

10. A process according to claim 1 wherein the marinade is incorporated into the raw meat in an amount of from 10% to 22% by weight based on the weight of the raw meat.

11. A process according to claim 1 wherein the marinade contains nongelatinized starch which gels at a temperature of from 90° C. to 100° C. in an amount of from 7% to 13% by weight based upon the weight of the marinade.

12. A process according to claim 1 wherein the marinade is injected into the raw meat.

13. A process according to claim 1 wherein the marinade and meat are churned.

14. A process according to claim 1 wherein the marinade is incorporated into the raw meat by injecting the marinade into the meat followed by churning the meat and marinade.

15. A process according to claim 1 wherein the raw meat is in the form of whole muscle.

16. A process according to claim 1 wherein the raw meat is in the form of slices.

17. A process according to claim 1 wherein the raw meat is in the form of cubes.

18. A process according to claim 1 wherein the meat is selected from the group consisting of beef, pork, mutton, lamb, veal, poultry and game.

19. A process according to claim 1 further comprising cooking the raw meat after incorporating the whey proteins therein and packaging the cooked meat.

20. A process extending to claim 19 further comprising refrigerating the packaged meat.

* * * * *

UNITED STATES PATENT AND TRADEMARK OFFICE
CERTIFICATE OF CORRECTION

PATENT NO. : 5,232,723
DATED : August 3, 1993
INVENTOR(S) : Jean-Pierre BISSON, et al.

It is certified that error appears in the above-identified patent and that said Letters Patent is hereby corrected as shown below:

Column 12, line 6 (line 1 of claim 20), "extending" should be --according--.

Signed and Sealed this

Twenty-ninth Day of March, 1994

Attest:

BRUCE LEHMAN

*Attesting Officer*    *Commissioner of Patents and Trademarks*